Dec. 31, 1963 J. L. SWEENEY 3,116,436

RASTER SCANNING SYSTEM

Filed Dec. 31, 1959 4 Sheets-Sheet 1

*INVENTOR.*
JOHN L. SWEENEY
*BY*
Thomas & Crickenberger

Dec. 31, 1963 J. L. SWEENEY 3,116,436

RASTER SCANNING SYSTEM

Filed Dec. 31, 1959 4 Sheets-Sheet 2

Dec. 31, 1963 J. L. SWEENEY 3,116,436

RASTER SCANNING SYSTEM

Filed Dec. 31, 1959 4 Sheets-Sheet 4

United States Patent Office 3,116,436

Patented Dec. 31, 1963

3,116,436

RASTER SCANNING SYSTEM

John L. Sweeney, Johnson City, N.Y., assignor to International Business Machines Corporation, New York, N.Y., a corporation of New York Filed Dec. 31, 1959, Ser. No. 863,231
18 Claims. (Cl. 315—18)

This invention relates to a raster generating system and more particularly to a system for generating a raster of interlaced fields on a cathode ray tube.

In numerous device employing cathode ray tubes a circuit or system is employed to produce a raster on the face of the cathode ray tube. The raster may be defined as a predetermined pattern of scanning lines which provides substantially uniform coverage of an area by succesive scans of an electron beam across the face of a cathode ray tube. In commercial broadcast television, for example, a cathode ray tube is used to synthesize the picture for presentation. The intensity of the electron beam is controlled by the variation in magnitude of the signal current, whereas, the elctron beam position is controlled by horizontal and vertical sweep circuits. In broadcast television a frame of 525 lines is repeated 30 times a second. A frame may be defined as a single complete picture. Double interlaced scanning is employed in which the electron beam starts from the upper left-hand corner of the cathode ray tube and in $\frac{1}{60}$ second this beam scans 262.5 lines in travelling to the bottom of the cathode ray tube. This is called one field, and a field may be defined as one of the equal parts into which a frame is divided. A second field of 262.5 lines is scanned and these lines lie among the first 262.5 lines in alternate fashion. The two fields taken together represent a frame of 525 lines. The two fields are interlaced, and interlace refers to the method of generating every other line during one downward sweep of the scanning beam and the remaining lines during the next downward sweep. This reduces flicker of the picture. In broadcast television and in certain other systems which employ cathode ray tubes a horizontal and a vertical deflection system are employed in which the interlace rate, defined as fields per frame, is a fixed number (such as two for broadcast television). The resolution of the raster of a cathode ray tube is determined by the interval number, or lines per frame, produced (such as 525 for broadcast television). The sweep circuits employed in broadcast television and in other cathode ray tube circuits produce a raster having a fixed interval number and interlace rate. Whenever it is desired to change the interval number or the interlace rate, major alterations must be made on existing sweep circuits or additional sweep circuits must be provided.

According to this invention a more flexible sweep generator system for a cathode ray tube is provided in which the interlace rate is a function of the number of pulses applied to one sweep generator for each input pulse applied to another sweep generator. A raster can be generated having any interlace rate and practically any in terval number not evenly divisible by the interlace rate. This provides a flexible system which requires neither alteration of the sweep circuits nor the need for additional sweep generating equipment when the interval number or the interlace is changed.

In an illustrative embodiment of the present invention a raster is produced on a cathode ray tube by a vertical deflection generator and a horizontal deflection generator, and the characteristics of the raster are determined by the relationships between the input signals applied to these deflection generators. One of the deflection generators includes a counter triggered by input signals. The output from the counter is coupled to a decoder, the output of which is applied to one of the deflection coils of the cathode ray tube. The interval number of the raster produced on the cathode ray tube is a function of the range of the counter employed. The interval number may be increased or decreased by respectively increasing or decreasing the range of the counter while holding the interlace rate constant. The interlace rate may be varied by varying the number of input pulses applied to the counter for each input pulse applied to the horizontal deflection generator while holding the interval number fixed. Furthermore, both the interlace rate and the interval number may be changed. Generally, the only requirement for choosing the interlace rate and the interval number is that the latter must not be evenly divisible by the interlace rate. Hence, this cathode ray tube deflection generation system is capable of producing a raster having practically any interval number and any interlace rate equal to one or greater than one. This system is applicable to numerous cathode ray tube circuits such as broadcast, closed circuit and compatible television, radar, facsimile, etc.

An adidtional feature of the present invention is in the provision of a raster scan generator for a cathode ray tube in which a binary counter operated by input pulses provides output signals to a binary-weighted decoder which in turn is connected to one set of deflection coils of the cathode ray tube. The interlace rate of the raster is a function of the number of input pulses applied to the counter for each input pulse applied to a sweep generator connected to another set of deflection coils of the cathode ray tube. The binary-weighted decoder may be a resistor-diode type network in which precision and temperature compensated components are preferably employed. By this arrangement high sweep-to-sweep accuracy (distance between successive horizontal scanning lines on the cathode ray tube) may be obtained.

These and other features of this invention may be more fully appreciated when considered in the light of the following specification and drawings in which.

Figure 1:
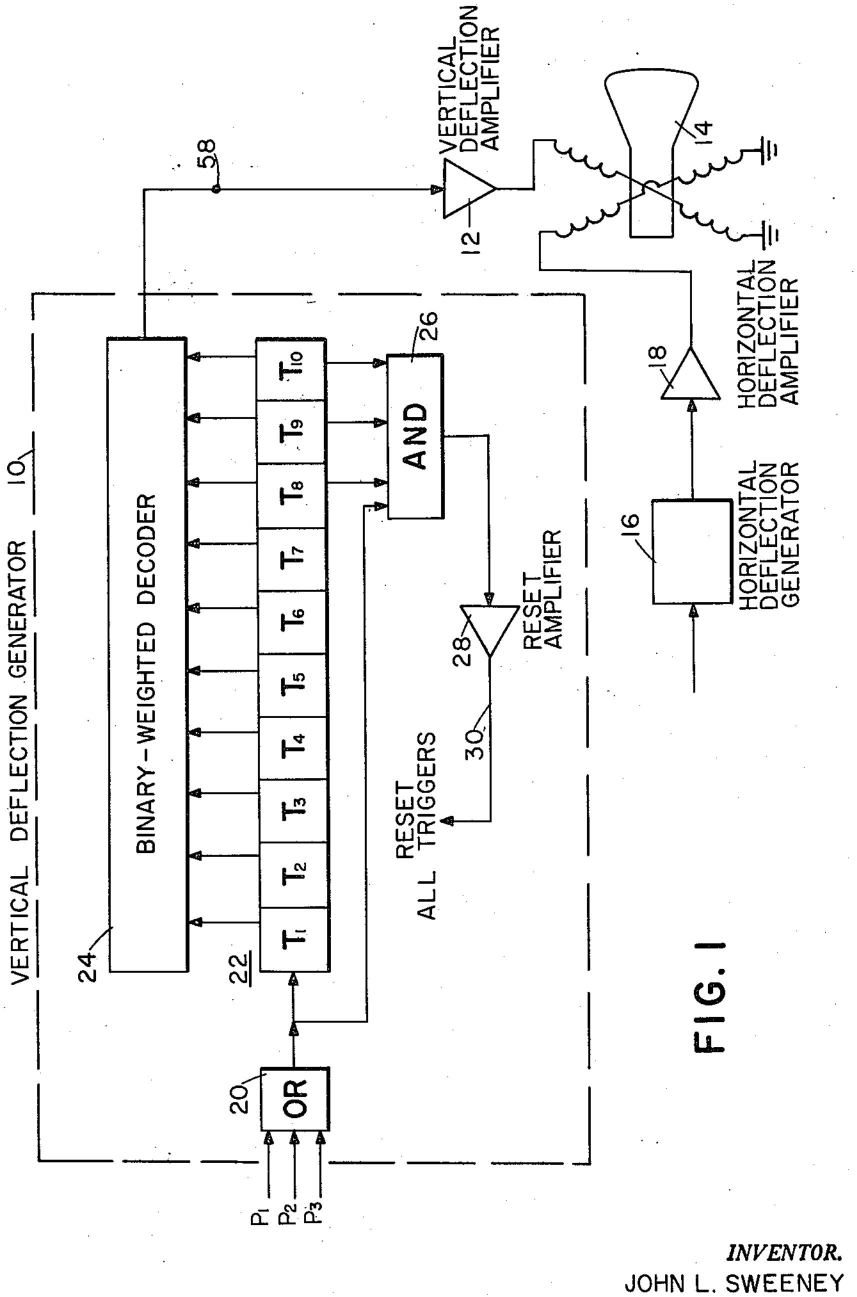
FIG. 1 is an illustration of a sweep circuit for a cathode ray tube employing the principles of the present invention.

In FIG. 1, a vertical sweep generator 10 is connected to a vertical deflection amplifier 12 which is connected to the vertical magnetic deflection coils of the cathode ray tube 14. A conventional horizontal deflection generator 16 is connected through a horizontal deflection amplifier 18 to apply saw-tooth pulses to the horizontal magnetic deflection coil of the cathode ray tube 14. Although a cathode ray tube having a magnetic deflection system is illustrated and described, it is to be understood that an electrostatic deflection system may be employed if desired. The vertical sweep generator 10 includes an OR gate 20 to which sets of driving pulses $P_1$, $P_2$ and $P_3$ are applied. According to a feature of this invention, an output from the OR gate 20 is applied to a binary counter indicated generally by the reference numeral 22. The binary counter 22 includes ten triggers $T_1$ through $T_{10}$ and this counter can accumulate a number up to 1,024. The triggers $T_1$ through $T_{10}$ are shown diagrammatically for simplicity, and it is to be understood that the necessary connections are included between each of the triggers. The output from the counter 22 is applied to a binary-weighted decoder 24. The output signal from the decoder 24 is a current of a magnitude proportional to the binary count in the counter 22. The output from the decoder 24 is applied to the vertical deflection coil of the cathode ray tube 14 through the vertical deflection amplifier 12. The signal applied to the deflection coils of the cathode ray tube 14, which signals are termed sweep signals, control the sweep of the electron beam in the cathode ray tube in a conventional manner well known to those skilled in the art. The three highest order triggers, $T_8$, $T_9$, and $T_{10}$, of the counter 22 are connected to an AND gate 26 along with the output from the OR gate 20. An output signal from the AND circuit 26 is applied through a reset amplifier 28 to a line 30 which amplified output signal is employed to reset all of the triggers of the counter 22 upon the occurrence of a predetermined count in the counter. The particular circuit for resetting the counter 22 is not illustrated since such circuits are well known to those skilled in the art. Any of the well known binary counters may be employed as the counter 22. A binary counter having the input pulses applied to the triggers in cascade, or a binary counter having the input pulses applied individually to the triggers may be employed. Although the vertical deflection generator 10 is illustrated as providing the vertical driving function for the cathode ray tube 14, it is to be understood that the generator 10 may be employed to provide the horizontal driving function if desired. The input pulses $P_1$ through $P_3$ applied to the OR gate 20 of the vertical deflection generator 10 are synchronized with the input signal to the horizontal deflection generator in a conventional manner well known to those skilled in the art.

Figure 2:
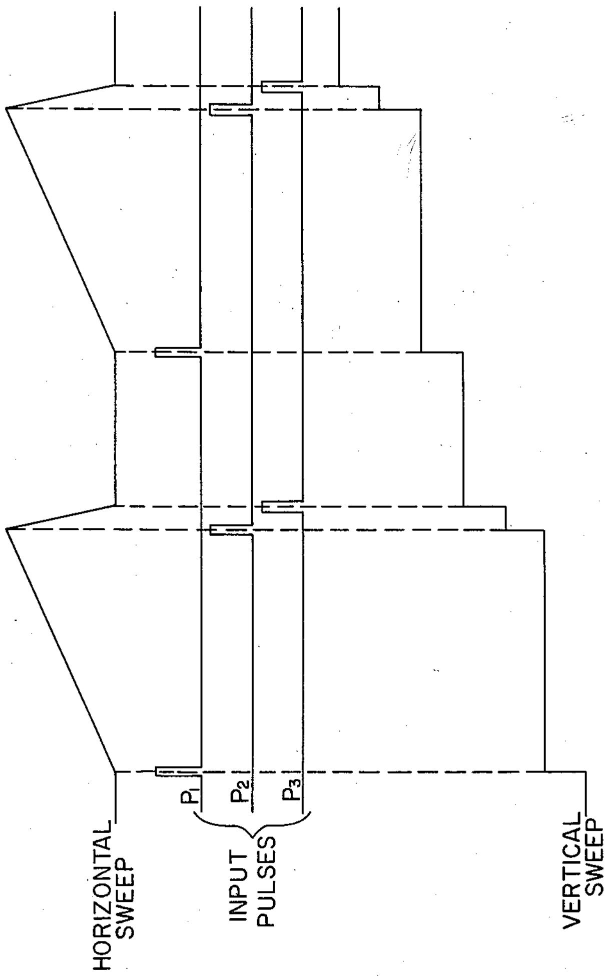
FIG. 2 is a diagram of the timing relationship between the horizontal and vertical sweep pulses applied to the cathode ray tube of FIG. 1.
Figure 3:
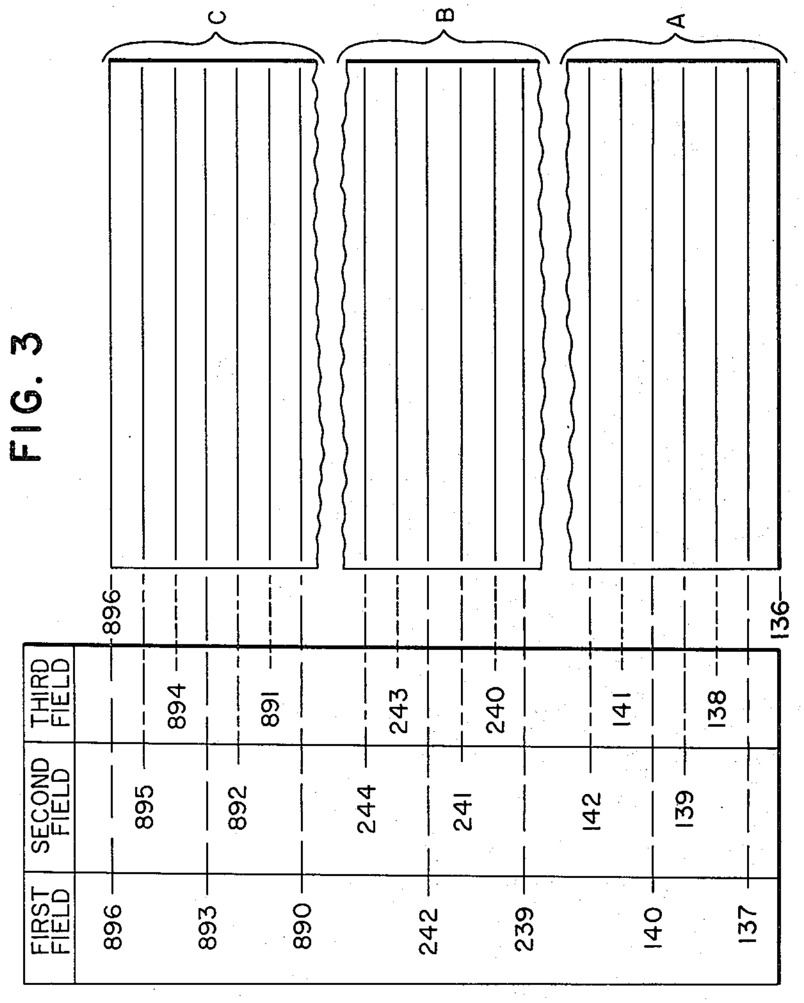
FIG. 3 is an illustration of the scanning sequence of a triple interlaced raster on segments of a cathode ray tube in accordance with the principles of the present invention.

According to another feature of the present invention, by employing an interval number (lines per frame) which is not evenly divisible by the interlace rate (fields per frame) any practical interval number and interlace rate for the raster may be employed. For purposes of illustration the operation of the scan generator shown in FIG. 1, with reference to the diagrams of FIG. 2 and FIG. 3, is described for producing a triple interlace rate. The interval number is a function of the range of the counter 22. The interlace rate is a function of the number of pulses in the sets of pulses (such as, $P_1$, $P_2$ and $P_3$) applied to the OR gate 20 for each horizontal sweep saw-tooth pulse. The ten trigger binary counter 22 can accumulate a number up to 1024. For each pulse received at an input to the OR gate 20 the output current at the terminal 58 from the binary-weighted decoder changes by $1/1024$. Referring to the cathode ray tube 14 this represents one unit step of position of the sweep. Since 1,024 states of the binary counter 22 are available the full range of the counter or the 1,024 states may be used, but this is not necessary. For illustrative purposes the system is described as having an interval number of 761 (lines per frame) and an interlace rate of 3 (fields per frame). In this case 761 of the counts of the binary counter 22 are utilized as the range of the counter. The AND gate 26 is connected to the binary counter 22 as shown in FIG. 1, and this gate senses the number 896. When the binary counter 22 has a count therein of 896, the next succeeding input pulse from the OR gate 20 to the binary counter 22 is applied also to the AND gate 26 which produces a reset pulse as an output. This reset pulse is applied through the reset amplifier 28 and the line 30 to reset all of the triggers of the binary counter 22 to a count of 136. The difference between the number 896 and the number 136 gives a difference of 760 to which a 1 is added to define the interval number. The binary counter 22 is initially set to a low order state or count of 136. Each of the input pulses $P_1$, $P_2$ and $P_3$ applied to the counter through the OR gate 20 increases the count in the counter by one. When the counter 22 reaches a count of 896, the next succeeding input pulse to the OR gate 20 causes the counter 22 to reset to a low order count of 136 and then adds one to this count. The resulting action is such that as sets of input pulses $P_1$ through $P_3$ are repetitively applied to the OR gate 20, the counter 22 sequentially progresses from a low number 136 to a high number 896. The output of the binary counter 23 is applied to the binary-weighted decoder 24 and each time the counter 22 progresses the decoder 24 integrates the output of the counter 22 and the output current from the decoder increases essentially in a staircase waveform fashion as shown in the lower curve in FIG. 2. For a triple interlace, a horizontal sweep of approximately 8.3 kilocycles is employed, but it is to be understood that any convenient horizontal sweep frequency may be used. With a horizontal sweep of approximately 8.3 kilocycles 11 frames per second and 33 fields per second are presented on the cathode ray tube when using an interval number of 761 and the interlace rate of 3. The timing relationship between the driving pulses $P_1$ through $P_3$ and the horizontal sweep is illustrated in FIG. 2. Each $P_1$ pulse begins as each horizontal sweep saw-tooth wave begins. The three driving input pulses $P_1$ through $P_3$ occur for each of the saw-tooth waves of the horizontal sweep as illustrated in FIG. 2. The resulting output from the vertical sweep generator 10, as amplified by the vertical deflection amplifier 12, is illustrated as the vertical sweep in FIG. 2. Therefore, for a positional movement of the vertical sweep of three unit steps one horizontal sweep is displayed.

Figure 4:
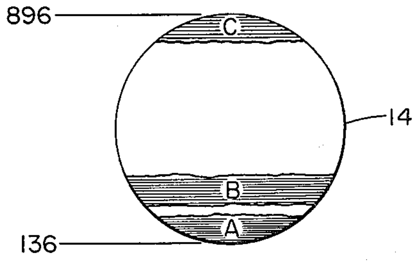
FIG. 4 is an illustration of the relationship of the segments of FIG. 3 to the face of the cathode ray tube.

FIGS. 3 and 4 illustrate the relationship of the sweeps or scanning lines produced in one frame during the first, second and third fields. Only segments of the face of the cathode ray tube 14 are illustrated and these segments are denoted "A," "B" and "C." The relationship of these segments to the entire face of the cathode ray tube is shown in FIG. 4. Although the scanning sequence is illustrated as progressing from the bottom to the top of the cathode ray tube, it is to be understood that the scanning may progress from the top to the bottom if desired. For the sake of clarity the spacing between the scanning lines in FIG. 3 is greatly exaggerated. With the binary counter 22 initially set to 136, the first input pulse $P_1$ increases the count in the counter to 137 and causes the first scanning line to be displayed on the cathode ray tube. Each input pulse $P_1$ applied to the OR gate 20 causes a scanning line to be displayed. Pulse $P_2$ increases the count in the counter to 138 and pulse $P_3$ increases the count to 139. No scanning line is produced by either of these two counts, 138 and 139, since only a pulse $P_1$ causes such a line to be produced. The next pulse $P_1$ increases the count to 140 and causes a scanning line to be produced. As the pulses $P_1$, $P_2$ and $P_3$ are sequentially applied, a scanning line is produced on the remaining segments A and B illustrated during the counts of 239, 242, 890, 893 and 896. The scanning line for the count 896 is shown as coinciding with the top of the cathode ray tube face. The first field of scanning lines is now complete. The last input pulse was $P_1$ which produced the count of 896 so the next input pulse $P_2$ causes the counter to reset to 136 and adds one to this count. The next input pulse $P_3$ increases the count to 138. The next $P_1$ input pulse increases the count to 139 and causes the first scanning line of the second field to be produced. Subsequent $P_1$ pulses cause scanning lines on the segments A, B and C illustrated to be produced for counts 142, 241, 244, 892 and 895. The scanning lines of the second field are now complete and they are interlaced as illustrated in FIG. 3. The next input pulse $P_2$ to the counter increases the count to 896, and the following input pulse $P_3$ causes the counter to reset to 136 and adds one to this count. The next input pulse $P_1$ increases the count to 138 thereby causing the first scanning line of the third field to be produced. Subsequent $P_1$ input pulses cause scanning lines on the segments A, B and C illustrated to be produced for the counts 141, 240, 243, 891 and 894. When the scanning line during the count of 894 in the third field is produced, the three fields are complete. These three fields represent one frame which includes 761 scanning lines. A frame is produced each $\frac{1}{11}$ second. The next input pulse $P_2$ increases the count to 895 and the following input pulse $P_3$ increases the count to 896. The next $P_1$ input pulse causes the counter to reset to 136, adds one to this count and produces the first scanning line of the first field of a second frame. As the input pulses $P_1$ through $P_3$ sequentially continue to arrive successive frames or rasters of 761 lines are displayed on the face of the cathode ray tube. It is now seen how the circuit of FIG. 1 is employed to generate a triple interlaced raster on a cathode ray tube.

In the foregoing description the interval number was chosen as 761 and the interlace rate was chosen as 3. However, because of flexibility of the circuit of FIG. 1, the interval number and the interlace rate may be changed as desired. Generally, the only limitation upon the choice of either of these factors is that the interval number must not be evenly divisible by the interlace rate. Specifically, the choice of interval number when the field per frame rate is 4 or greater is subject to the further limitation that the fractional remainder must be one which cannot be reduced from its original denominator. For example, an interval number divided by the rate giving $4\frac{1}{2}$ ($4\frac{2}{4}$) will not provide the proper interlace, while a ratio of $4\frac{1}{4}$ or $4\frac{3}{4}$ will provide a proper interlace.

In the above description of a triple interlaced raster having an interval number of 761, $761 \div 3 = 253\frac{2}{3}$ which is not a whole number and thereby satisfies this requirement. Similarly, in a quadruple interlaced raster, $761 \div 4 = 190\frac{1}{4}$ is not a whole number and is non-reducible. Therefore, for a quadruple interlace the interval number may be 761. Again taking 761, the counter 22 will reset after a count of 896 (as in the above-described triple interlace technique) to a number of 136. This gives a difference of 760 plus 1, or 761 which is the interval number. Four input pulses to the OR gate 20 of FIG. 1 are used for a quadruple interlace as three input pulses are used for a triple interlace. Each set of these four input pulses occurs for each horizontal sweep saw-tooth pulse, and each $P_1$ pulse occurs as each saw-tooth pulse begins. The counter 22 is initially set to a count of 136 and input pulses $P_1$ through $P_4$ are applied to the OR gate 20. As the four input pulses are sequentially applied, scanning lines are displayed during the counts of 136, 140, . . . 892 and 896 for the first field; during the count 139, 143, . . . 891 and 895 for the second field; during counts 138, 142, . . . 890 and 894 for the third field; and during the counts 137,141, . . . 889 and 893 for the fourth field. This sequence produces one frame including 761 lines and four fields. Upon the occurrence of the next $P_1$ pulse the above sequence is started again. From the foregoing, it is seen that an interlaced raster may be produced on a cathode ray tube having any practical interval number and interlace rate. The AND gate and the reset circuit may be instrumented to reset the counter from any high number to any low number. Additional triggers may be employed in the counter to provide an even greater range and larger interval numbers and thereby higher resolution if desired. Furthermore, a raster having no interlace may be produced. In this instance each input P pulse occurs at the beginning of each saw-tooth pulse of the horizontal sweep. Thus, it is now apparent that the interlace rate is a function of the number of pulses in input sets of pulses for each horizontal sweep pulse. The system of the present invention is readily adaptable to numerous circuits which employ cathode ray tubes, such as, television, radar and facsimile. Applications to television, for example, include compatible television systems for domestic and foreign TV receivers, slowed down video transmittal, etc.

Figure 5:
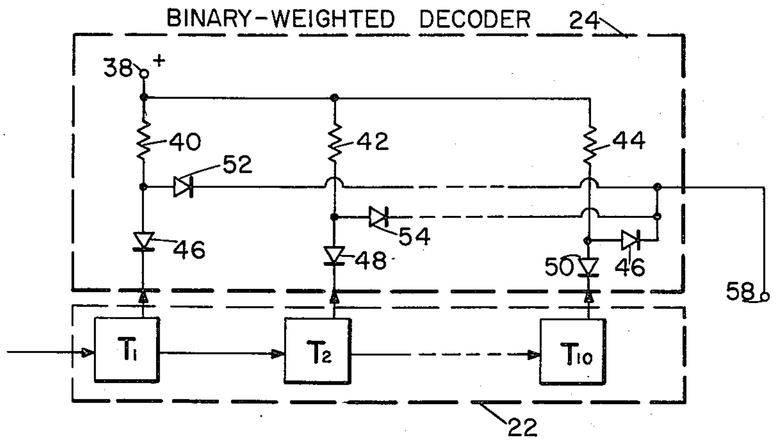
FIG. 5 is a circuit diagram of a component of the FIG. 1 system.

FIG. 5 illustrates a circuit diagram of the binary-weighted decoder 24 of FIG. 1. Only three stages are shown since each of the stages is essentially identical. According to a further feature of the present invention, the binary-weighted decoder of FIG. 5 converts the binary count of the counter 22 of FIG. 1 into a current of a value proportional to the count in the counter and provides high sweep-to-sweep positioning accuracy of the scanning lines on the cathode ray tube 14. In each stage of the decoder 24 a positive potential source is connected by way of a terminal 38 through a resistor to one end of a blocking diode the other end of which is connected to the output of one of the triggers of the counter 22. The first stage of the decoder 24 includes a resistor 40 and a blocking diode 46, the second stage includes a resistor 42 and a blocking diode 48, and the tenth stage includes a resistor 44 and a blocking diode 50. An output signal is taken from each stage through an output diode to an output terminal 58. The output diodes of the first, second and tenth stages are diodes 52, 54 and 56, respectively. Each of the intermediate stages (not shown), stages three through nine, include corresponding components. The resistor in the tenth stage, resistor 44, is chosen to be of a value to pass one-half of the maximum output current of the decoder. The value of a corresponding resistor of the ninth stage (not shown), is equal to twice the value of the resistor 44 of the tenth stage. The value of a corresponding resistor of the eighth stage (not shown) is equal to four times the value of the resistor 44 of the tenth stage. The value of a corresponding resistor of the seventh stage (not shown) is equal to eight times the value of the resistor 44 of the tenth stage. The corresponding values of resistors in the sixth through the first stages increase by powers of two in a similar manner. Each of the components of each stage of the binary-weighted decoder 24 may be precision components, and the resistors may be temperature compensated to provide a highly accurate output signal from the decoder to cause very accurate positional control of the presented sweeps on the cathode ray tube 14.

In the operation of the binary-weighted decoder 24 of FIG. 5, current normally flows from the positive potential terminal 38 to ground through the resistor 40, the blocking diode 46 and the trigger $T_1$ in the first stage; through the resistor 42, the blocking diode 48 and the trigger $T_2$ in the second stage; through corresponding components in the third through the ninth stages; and through the resistor 44, the blocking diode 50 and the trigger $T_{10}$ in the tenth stage whenever any of these triggers is in the Zero state. When any of the triggers $T_1$, $T_2$ . . . and $T_{10}$ is in the One state the cathodes of the blocking diodes 46, 48, . . . and 50, respectively, are biased with a positive potential thereby blocking current flow therethrough. In this case, current is caused to flow through the respective output diodes 52, 54, . . . and 56 to the output terminal 58 of the decoder. The output current from the output terminal 58 is of a magnitude proportional to the count in the counter, since each of the resistors 40, 42, . . . and 44 of stages 1, 2, . . . and 10, respectively, are of the relative magnitudes indicated above.

It is now seen that the present invention provides a raster scan generator which produces no interlace or any desired interlace rate of the raster on the face of a cathode ray tube. The interlace rate is a function of the number of pulses in sets of pulses applied to the vertical sweep generator for each horizontal sweep pulse. The vertical sweep generator includes a binary counter triggered by these pulses and a decoder network to control the current applied to the vertical deflection coil of a cathode ray tube. The interval number of the raster of the cathode ray tube may be any practical number subject to the limitations set forth herein and is a function of the range of the binary counter. Precision components may be employed in the binary-weighted decoder which is a resistor diode type network. A flexible system is therefore realized having high resolution and high sweep-to-sweep positioning accuracy without any increase of generating equipment.

What is claimed is:

1. A scan generator for a cathode ray tube comprising: a cathode ray tube having horizontal sweep control means and vertical sweep control means to control the scanning of the electron beam of the cathode ray tube; said vertical sweep control means including a counter; a decoder; first means to apply input signals to said counter whereby said counter is advanced; said counter being directly connected to said decoder whereby said decoder produces an analog output proportional to the count in said counter; reset means connected with said counter to reset said counter upon the occurrence of a given combination of signals in said counter; second means applying the output of said decoder to the vertical means of said cathode ray tube; and third means applying signals to said horizontal means; whereby at least certain of said signals from said first means together with the signals from said third means control the scanning of the electron beam of said cathode ray tube to cause a raster to be produced as said counter is sequenced from a low number to a high number.

2. The apparatus of claim 1 wherein the interval number of said raster is a function of the range of said counter.

3. A scan generator for a cathode ray tube as in claim 1 wherein a scanning line is produced for each third signal from said first means; and said raster is triple interlaced.

4. A scan generator for a cathode ray tube as in claim 1 wherein said reset means includes an AND circuit which causes said counter to be reset to said low number upon the occurrence of said high number.

5. A scan generator for a cathode ray tube as in claim 1 wherein said raster includes interlaced scanning lines and the number of input signals from said first means for each of the signals from said third means determines the interlace rate of said raster.

6. A scan generator for producing an interlaced raster on a cathode ray tube comprising: a counter; a decoder; means applying input pulses to said counter to thereby cause said counter to sequentially progress from a low number to a high number; means connecting said counter to said decoder whereby said decoder sequentially produces output signal combinations progressing from signal combinations representative of a low value number to a high value number; means including a logical device to reset said counter from said higher number to said low number; a horizontal deflection system coupled to said cathode ray tube; a vertical deflection system associated with said cathode ray tube; and means applying said output signal from said decoder to said vertical deflection system; whereby an interlaced raster is produced on said cathode ray tube.

7. A scan generator for producing an interlaced raster on a cathode ray tube as in claim 6 wherein said input pulses are recurring sets of pulses and the interlace rate of said interlaced raster is releated to the number of pulses in said sets of pulses.

8. A scan generator for producing an interlaced raster on a cathode ray tube as in claim 7 wherein the interval number of said interlaced raster is not evenly divisible by said interlace rate and its remainder is not reducible.

9. A scan generator for producing an interlaced raster on a cathode ray tube as in claim 7 wherein each of said sets of pulses consists of three pulses; and a triple interlaced raster is produced on said cathode ray tube.

10. A device for providing an interlaced raster for a cathode ray tube comprising: first means for producing pulses; a counter; second means connecting said first means to said counter; a decoder; third means connecting said counter to said decoder; fourth means to reset said counter; fifth means connecting said decoder to said cathode ray tube to control the sweep of said cathode ray tube; whereby said pulses cause said counter to sequentially progress from a low number to a high number thereby causing said fifth means to generate interlaced scanning lines on said cathode ray tube.

11. A device for providing an interlaced raster for a cathode ray tube as in claim 10 wherein each third pulse of said pulses causes a scanning line to be produced on said cathode ray tube; and each time said counter progresses to said high number said fourth means resets said counter to said low number.

12. A device for providing an interlaced raster for a cathode ray tube as in claim 10 wherein the difference between said high number and said low number plus unity determines the interval number of said raster.

13. A device for providing an interlaced raster for a cathode ray tube as in claim 10 wherein said counter is a binary counter; said decoder is a binary-weighted decoder having a plurality of stages each of which includes at least a resistor and a pair of diodes; and means interconnecting the resistor and diodes of each stage; whereby an output current proportional to the count in said counter is produced by said decoder.

14. A device for providing an interlaced raster for a cathode ray tube comprising a cathode ray tube; vertical and horizontal deflection coils associated with the cathode ray tube to control the sweep thereof; a binary counter; an OR circuit connected to said counter for supplying pulses thereto; a binary-weighted decoder directly connected to the output of said counter for converting the binary output of said counter to an analog signal, and connected to said vertical deflection coils for applying said analog signal thereto; means for applying pulses to said OR circuit to cause said counter to advance from a low number to a high number; an AND circuit connected to receive pulses from certain stages of said counter and from said OR circuit, said AND circuit being responsive to coincident input pulses to reset said counter to said low number; and a horizontal deflection generator supplying pulses to said horizontal deflection coils in a timed relationship with the pulses applied to said OR circuit; whereby the pulses applied to said counter cause said counter to sequentially progress from said low number to said high number thereby causing interlaced scanning lines to be generated on said cathode ray tube.

15. A device for generating a raster which substantially covers the face of a cathode ray tube wherein the raster includes frames having one or more fields, a cathode ray tube having horizontal sweep control means and vertical sweep control means to control the scanning of an electron beam over the face of the cathode ray tube, said vertical sweep control means including vertical deflection means for positioning an electron beam in a vertical position within said cathode ray tube, a decoder having input means and output means, the output means of the decoder being connected to said vertical deflection means, a digital counter having input means which responds to pulses, said pulses operating the counter to advance the counter from a low number through successive counts to a high number, said counter having output means connected to the input means of the decoder, means for applying pulses to the horizontal sweep control means and means for applying one or more pulses to said counter for each pulse applied to said horizontal sweep control means, whereby said counter advances from a low number to a high number once for each field generated on the face of the cathode ray tube.

16. A device for generating a raster composed of horizontal scans of an electron beam which substantially cover the face of a cathode ray tube wherein the raster includes a frame having one or more fields, a cathode ray tube having horizontal sweep control means and vertical sweep control means for controlling the scan of an electron beam over the face of a cathode ray tube, the vertical sweep control means including vertical deflection means for positioning an electron beam in a vertical position within the cathode ray tube, a decoder having input means and output means, the output means of the decoder being connected to said vertical deflection means, a counter having input means which responds to pulses and advances the counter successively from a low number through each intermediate number to a high number, the counter having output means connected to the input means of the decoder, reset means connected between the output means of the counter and the input means of the counter, said reset means serving to reset said counter from a predetermined high value to a predetermined low value, means for applying pulses to the horizontal sweep control means, and means for applying one or more pulses to said counter for each pulse applied to said horizontal sweep control means.

17. The apparatus of claim 16 wherein the reset means may be changed to alter the low number or the high number of said counter.

18. A device for generating a raster which substantially covers the face of a cathode ray tube wherein the raster includes a frame having one or more fields, a cathode ray tube having horizontal sweep control means and vertical sweep control means to control the scanning of an electron beam over the face of the cathode ray tube, said vertical sweep control means including vertical deflection means for positioning an electron beam in a vertical position, a digital-to-analog decoder having digital input means and analog output means, the analog output means being connected to said vertical deflection means, a digital counter having digital input means which responds to pulses and advances the counter successively from a low number to a high number, said counter having digital output means connected to the digital input means of the digital-to-analog decoder, reset means having an input connected to a selected portion of the digital output means of the digital counter, said reset means having an output coupled to the digital input means of said counter for resetting said counter to a predetermined low value, means for applying pulses to the horizontal sweep control means and means for applying one or more pulses to said digital counter for each pulse applied to said horizontal sweep control means.

References Cited in the file of this patent

UNITED STATES PATENTS

| | | |
|---|---|---|
| 2,549,780 | Earp | Apr. 24, 1951 |
| 2,646,529 | Werenfels et al. | July 21, 1953 |
| 2,717,329 | Jones et al. | Sept. 6, 1955 |
| 2,840,637 | McNaney et al. | June 24, 1958 |
| 2,902,684 | Mork | Sept. 1, 1959 |